Oct. 10, 1967  G. MÜLLER  3,345,745
ORTHODONTIC FASTENING MEANS AND METHOD OF APPLYING THE SAME
Filed Jan. 26, 1965  3 Sheets-Sheet 1

INVENTOR
Gerhard Müller
BY
Michael S. Striker

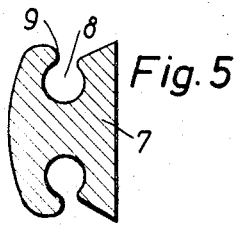
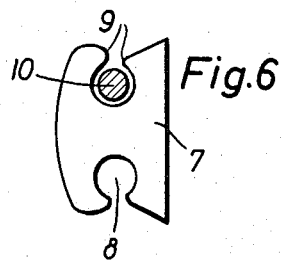
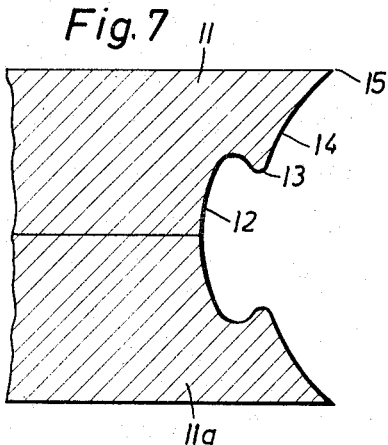
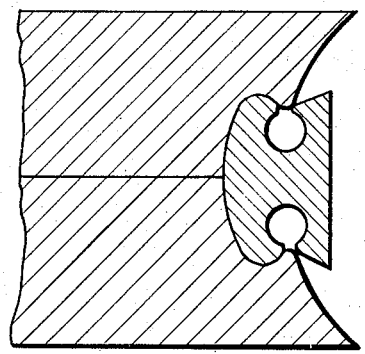
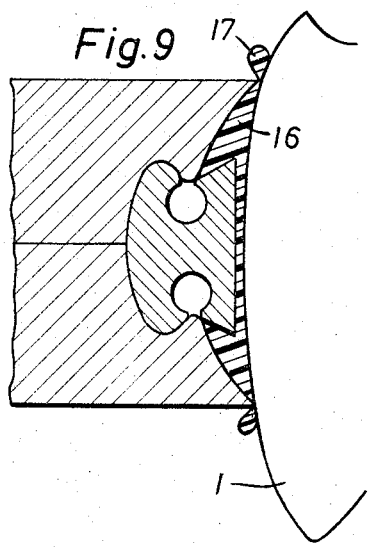
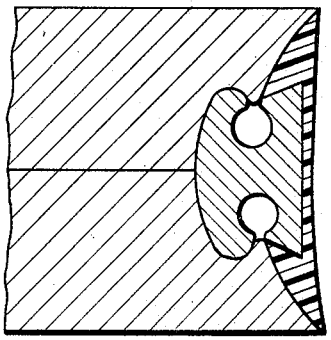

Oct. 10, 1967  G. MÜLLER  3,345,745
ORTHODONTIC FASTENING MEANS AND METHOD OF APPLYING THE SAME
Filed Jan. 26, 1965  3 Sheets-Sheet 3
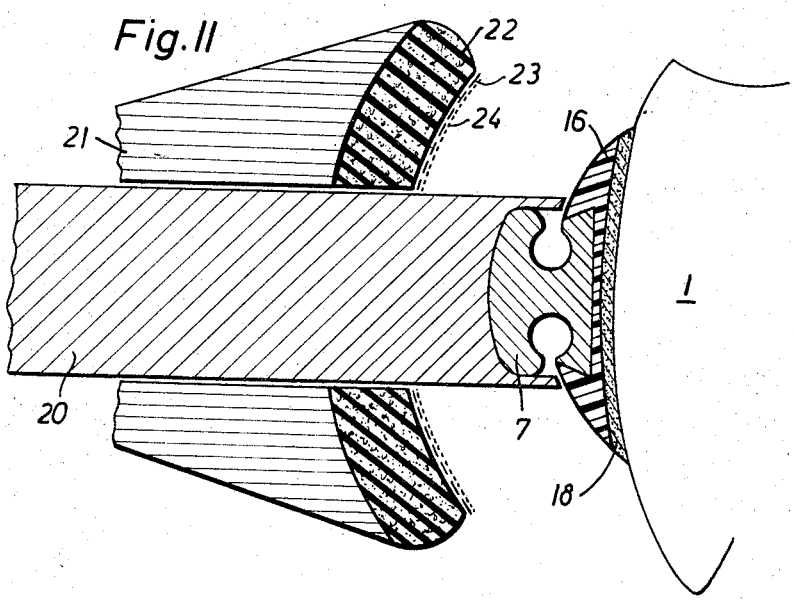
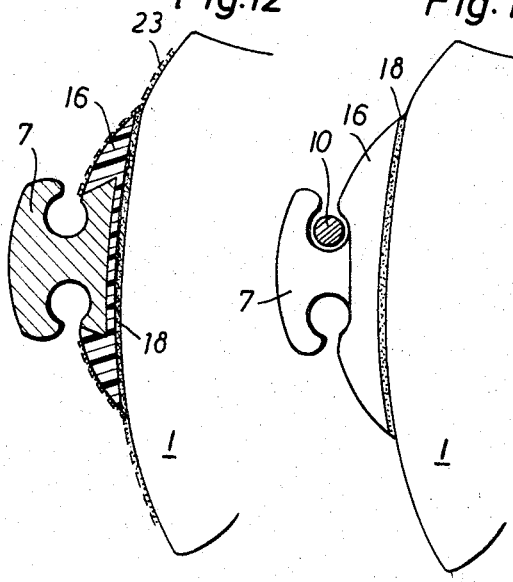
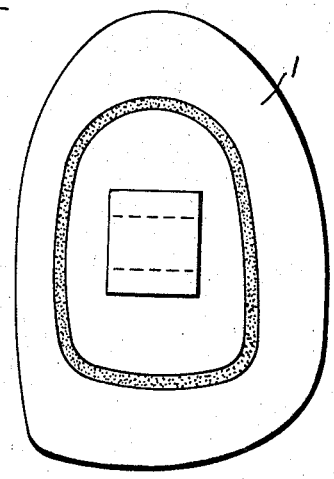
INVENTOR
Gerhard Müller
BY
Michael J. Striker 3,345,745
ORTHODONTIC FASTENING MEANS AND
METHOD OF APPLYING THE SAME
Gerhard Müller, Schumannstrasse 55, Bonn, Germany
Filed Jan. 26, 1965, Ser. No. 428,153
Claims priority, application Germany, Feb. 20, 1964,
M 59,999
16 Claims. (Cl. 32—14)

The present invention relates to orthodontic fastening means and a method of applying the same. More particularly, the present invention is concerned with attaching orthopedic devices for the treatment of the jaw or orthodontic devices as well as removable dentures by means of a rigid or substantially rigid fastening element, a so-called attachment or bracket, which may be attached to a single tooth, as well as to a new structure of such attachment or bracket, and also to auxiliary devices used in connection therewith.

Basically, there are two different possibilities for attaching dental orthopedic or orthodontic devices, on the one hand, plates or mandibular dental arches may be removably anchored like dentures and, on the other hand, these devices may be attached to brackets or attachments which are adhered to a single tooth. In the first case, easy removability of the devices is required or necessary so that the plate or the like can be removed and then again reinserted by the patient without needing any help. This is necessary since the cleaning of such plates or the like and should be carried out daily. The plates or mandibular dental arches may also be formed of two parts which may be narrowed or expanded relative to each other by means of a screw arrangement.

The present invention relates to the second alternative, namely to fastening means or attachments or brackets which are to be attached to a single tooth and which are not to be removed by the wearer but only by his dentist.

The known brackets or attachments generally consist of metal and are fixed to metal bands which are cemented onto or around the tooth and sometimes also by forming bore holes in the crown of the tooth and inserting corresponding bracket portions into the same. However, several disadvantages are connected therewith. In order to slide the ring-shaped metal band over the tooth, the latter has to be separated from adjacent teeth, in other words, the teeth must be moved apart. Furthermore, these metal bands have to be individually produced or preformed and then exactly adapted to the configuration of the individual tooth and cemented onto the same. This requires considerable time and effort. Further disadvantages are found in the fact that the risk of caries is considerably increased by application of these metal bands because thereby areas of retention of food residue are formed. The patient also frequently dislikes to wear such metal rings, particularly around one of the frontal teeth because they are quite unsightly. On the other hand, the forming of bore holes in the crown of a natural tooth involves damaging such tooth.

It is therefore an object of the present invention to overcome certain disadvantages of prior art orthodontic fastening means.

It is another object of the present invention to provide orthodontic fastening means and a method of applying the same which in an extremely simple and economical manner and without damage to the teeth permit the fastening of the bracket or attachment to the tooth.

Other objects and advantages of the present invention will become apparent from a further reading of the description and of the appended claims.

With the above and other objects in view, the present invention contemplates a method of adhering a holding bracket to a tooth, which method comprises the steps of molding onto one end of substantially rigid holding brackets a plug of plastic material having an end face adapted to be directed, when the bracket is attached to a tooth, towards the tooth, conforming the end face to the configuration of a tooth surface to which the bracket is to be attached, and cementing the end face of the plug to the surface of the tooth.

The present invention is also concerned with an attachment adapted to be adhered to a tooth, which attachment comprises, in combination, a substantially rigid plastic member having an end surface corresponding to the surface portion of the tooth to which the attachment is to be adhered, and a preformed substantially rigid holding bracket having a bottom portion partly embedded in the plastic member spaced from the end surface thereof, and having an upper portion projecting from the bottom portion and being formed on opposite sides thereof with grooves defining at the outer surface of the bracket a slot of smaller cross section than the maximum dimension of the grooves, respectively, so as to be adapted to retain within the grooves holding wires and the like.

It is also within the scope of the present invention to provide an auxiliary device for provisionally fastening the attachment to be cemented on one surface thereof to a tooth and for holding the attachment on the tooth surface until the attachment is firmly cemented thereto, the auxiliary device comprising a first plunger adapted to engage the center portion of a surface of the attachment opposite to the one surface for pressing the one surface onto the tooth surface, and a second annular plunger slidably guided on the first plunger and having an annular end portion of resilient material having an end facing and extending beyond the opposite surface of the attachment and adapted to carry an adhesive foil over the end face so that the attachment may provisionally be fastened to the tooth by holding the attachment temporarily with the first plunger against the tooth surface and by pressing the adhesive foil by means of the second plunger onto the second opposite surface and the tooth surface extending beyond the opposite surface.

According to the present invention, a rigid attachment which is shaped so as to fit exactly onto the surface of the tooth and which is formed of a hard synthetic resin or at least includes a tooth-contacting portion of hard synthetic resin is adhered, generally to the outwardly directed surface of the tooth, by means of a synthetic resin which is resistant against attack under the conditions existing in the mouth and which will harden without changing its volume.

The hard synthetic material of which the bracket or attachment of the present invention is produced, or which forms at the least the tooth contacting portion thereof, may consist, for instance, of an acrylic resin, a polyamid, a polyurethane, a duroplastic such as a phenolic resin, or an epoxy resin. It is adhered to the tooth by means of a synthetic resin adhesive which is stable and durable in the mouth and which will harden without damage of its volume, for instance, an epoxy resin. Only rigid attachments which over their entire front face are firmly adhered to the surface of the tooth will assure firm adherence, because they are able to convey to the tooth any forces exerted against the attachment with a very small and even specific stress per unit of adhering surface. The attachments do not only have to convey pressure and tension stresses as well as torsional forces, but they must also be able to withstand the forces casued by movement of the muscles which actuate the jaws.

The non-metallic materials and adhesives which are used according to the present invention are known per se, however, it appears that up to now they have not been suggested for the purpose of the present invention, possibly because either the strength of the synthetic resin or of the adhesive bond which could be formed between the hard synthetic resin and the tooth surface were underestimated.

A useful method of adhering attachments or brackets to a tooth which has been found advantageous in practice is carried out by introducing into an open mold which may be resilient or divisible into parts, a preformed bracket of any desired material such as metal or synthetic resin, thereafter filling the remaining space in the mold with a synthetic material which will harden at ambient temperatures and without application of pressure, for instance a self-polymerizing resin such as methacrylic acid methyl resin, and then pressing the mold with its open end against the tooth or against a cast of such tooth. The thus formed attachment remains for some time in the mold and after hardening and firm adherence of the synthetic material to the bracket portion, the holding member which now consists of the bracket and the plug of the synthetic material adhering thereto, is adhered with the surface of the plug which corresponds to the tooth surface to the latter, with the help of a binder which will quickly and without application of pressure harden at ambient temperature without changing its volume, such as for instance epoxy-resins.

The use of the hard or hardenable synthetic materials for forming the attachment, or for at least forming the portion thereof which will come in contact with the tooth, has the further purpose of making it possible to remove the attachment from the tooth after it has served its purpose, for instance after the orthodontic regulation of the teeth has been completed. This can be done without causing damage to the dental enamel. The hard synthetic resin plug as well as the adhesive layer may be mechanically removed from contact with the tooth with relative ease by the dentist.

According to another manner of adhering the attachment to the tooth, the molded bracket, is removed after hardening from the mold and, if necessary, any fins formed on the plug of the plastic material are removed. Thereafter, prior to adhering the attachment to the tooth, the same is placed into an auxiliary device or holding device, by means of which attachment during the adhering of the same to the outer surface of the tooth is pressed against the latter.

In many cases, however, for instance when using a 2-component adhesive such as an epoxy resin, the setting time is relatively long and may be equal to several hours. In such cases the attachment will slightly adhere to the tooth after a much shorter period of time, however, it cannot be exposed to any stresses or loads until after is advantageous, and adhesive. Under these circumstances, it is advantageous, and also within the scope of the present invention to fix the attachment to the tooth until the adhesive has been completely hardened by means of a provisional attaching agent using for instance methyl-2-cyanoacrylate or butyl-2-acrylate as cement, for instane an adhesive foil of annular shape, which foil is then removed after the adhesive binding of the attachment to the tooth has completely hardened. In this manner, firm adherence and prevention of lateral movement of the freshly adhered attachment is assured and the danger of dislocation of the attachment during the time required for setting of the adhesive is eliminated. Thereby, it is particularly advantageous to apply the provisional fastening means, such as the adhesive foil in one and the same working step together with adhering the attachment to the tooth by means of the hardenable adhesive. It is thus avoided in a very simpler manner that the attachment might be laterally displaced during application of the provisional holding foil. The permanency of the adhesive connection depends to a very large degree on the exact juxtaposition of correspondingly formed surface portions of the tooth and of the synthetic plug portion of the attachment so that any slight irregularities of the tooth surface correspond to the irregularities in the contacting portion of the adhesive plug surface, which initially has been formed by pressing the still soft synthetic material of the plug against the tooth surface.

The attaching of orthodontic devices is further simplified by having the holding wires or resilient wires of the orthodontic or the like device or of the denture which is to be held by the attachment of the present invention pressed, for instance in vertical direction, into the holding bracket so as to avoid those forces acting in a direction perpendicular to the tooth surface, for instance forces which are exerted in order to put a recessed tooth into its proper position, could lead to disengagement of the holding or resilient wire from the attachment.

However, in some cases it is desirable to achieve a further fixing of the wires to the attachment by dropping onto the wire after the same has been attached to the bracket, a small quantity of self-polymerizing synthetic resin which will cover the point of contact between the wire and the bracket and thereby immobilize the wire relative to the bracket at this point.

Basically, it is of course also possible to obtain such an additional fixing of the wire relative to the bracket by means of a wire binding, however, the fixing of the wire to the brackets by means of a drop of self-polymerizing synthetic resin is much simpler and also the eventual removal of the wires is simplified in this manner since the drop of synthetic resin forms only a mechanical connection between the bracket portion and the synthetic resin which, when desired, can be easily detached.

According to a preferred embodiment, the attachment of the present invention will comprise a preformed substantially rigid holding bracket having an enlarged bottom portion which is partly embedded in a plastic member or plug, the latter terminating in a surface which conforms to the surface portion of the tooth to which the attachment is to be adhered, while the bracket at its free end opposite to the plug has an upper portion projecting from its enlarged bottom portion and being formed with hook-shaped elements which define a groove and form at the outer surface of the bracket a slot of smaller cross section than the maximum cross section of the groove, into which groove the holding or resilient wires for the orthodontic device or the like can be wedged. With this embodiment, practically all desired fastening operations for orthodontic devices and the like can be carried out without risking an involuntary disengagement. For instance, it is also possible to use double hooks and grooves and two wires which are wedged into the two grooves, respectively, whereby a combined and thus even stronger holding effect is achieved.

For aesthetic or cosmetic purposes, it is recommended that the attachment, and particularly the plug of synthetic material forming part thereof, but possible also the pre-shaped holding brackets are made of a preferably glass clear transparent or tooth colored hard synthetic resin which may be an acrylic resin, a polyamide, a polyurethane, a duroplast such as phenolic resin, or an epoxy resin. Since such braces, orthodontic devices or the like frequently have to be carried for prolonged periods of times, even for several years, the patient frequently is reluctant to carry such devices in his mouth because he is concerned with the undesirable change in his appearance which is caused thereby. In this respect it is helpful if the attachment or at least the major portion thereof is produced, according to a preferred embodiment of the present invention, of a glass clear or tooth colored material as contrasted to the prior art metal band arrangements.

A suitable auxiliary device for provisionally fastening the above discussed attachment to a surface portion of the tooth comprises a first plunger having an end face, and a second annular plunger slidably guided on the first plunger and having an annular resilient end portion facing in the same direction as the end face, the annular resilient end portion preferably being of concave configuration. The provisional adhesive foil may then be placed on the annular concave resilient surface of the second plunger and pushed by the same onto the annular outer portion of the attachment and the adjacent tooth portions so as to temporarily hold the attachment in place.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 5 is a lateral view of the bracket formed with two grooves which define at the outer surface of the bracket a slot of smaller cross section than the maximum cross section of the grooves;

FIG. 6 is a cross sectional view of the bracket shown in FIG. 5 with a wire wedged into one of the grooves;

FIG. 7 is a cross sectional view through a mold adapted to engage the bracket of FIG. 5;

FIG. 8 is a cross sectional view through the mold of FIG. 7 with the bracket inserted therein;

FIG. 9 is a cross sectional view illustrating the molding of the synthetic resin portion of the attachment by filling the portion of the mold not occupied by the bracket with hardenable synthetic resin and pressing the thus filled mold onto the tooth surface, whereby also fins will be formed adjacent the mold;

FIG. 10 is a cross sectional view of the mold and the molded product formed according to FIG. 9;

FIG. 11 is a cross sectional view illustrating the permanent placing of the attachment comprising the bracket and the synthetic resin plug portion by means of an auxiliary device onto a tooth surface;

FIG. 12 is a cross sectional view illustrating the attachment placed onto the tooth surface and temporarily held in position by the auxiliary adhesive foil;

FIG. 13 shows the attachment of FIG. 12 firmly adhered to the tooth, with an orthodontic wire (shown in cross section) wedged into one of the grooves of the bracket; and FIG. 14 is a frontal view of the embodiment shown in FIG. 9.

Figure 1:
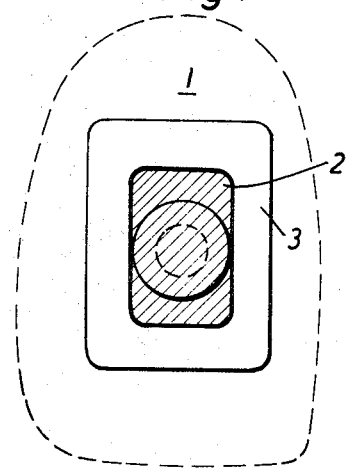
FIG. 1 is a frontal view of an attachment placed onto the outer surface of a tooth and provisionally adhered thereto.
Figure 2:
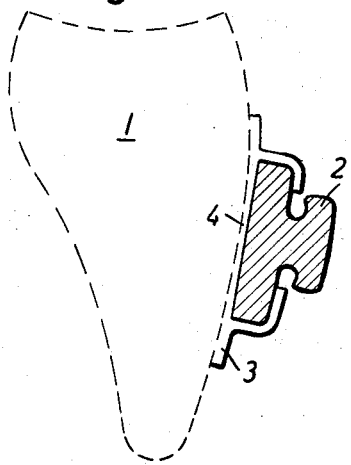
FIG. 2 is a lateral view of the attachment shown in FIG. 1.

Referring now to the drawing and particularly to FIGS. 1 and 2, it will be seen that the attachment comprises a holding bracket which is integral with the base portion of the attachment which faces the tooth and which is adhered to the tooth by means of adhesive layer 4 which may consist of an epoxy resin. A provisional fastening means in the form of a pressure-sensitive adhesive tape or foil 3 is applied so as to hold the attachment 2 in position on tooth 1 until the epoxy adhesive 4 has completely hardened. The orthodontic or orthopedic apparatus or device is attached to the bracket or attachment only after the same has been firmly adhered to the tooth, preferably on the next following day.

Figure 3:
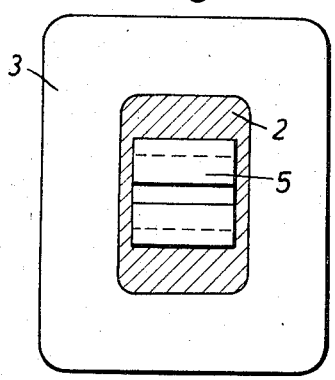
FIG. 3 is a frontal view of an attachment formed of a metal bracket and a synthetic resin plug.
Figure 4:
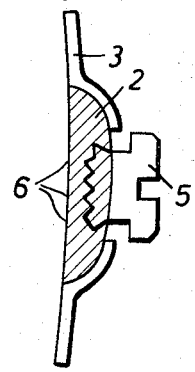
FIG. 4 is a lateral view of the attachment shown in FIG. 3, partly in cross section.

While the entire attachment of FIGS. 1 and 2 may consist of hard synthetic resin or material, the attachment illustrated in FIGS. 3 and 4 comprises a synthetic resin portion 2 and a metal element 5 which has been firmly adhered to the synthetic resin portion preferably in a mold, whereby metal portion 5 is formed with a transverse slot. As can be clearly seen in FIG. 4, the tooth contacting surface 6 of the resin portion of the attachment is slightly arched so as to more closely fit to the shape of the tooth surface.

FIGURES 5–10 show somewhat modified attachments whereby FIG. 5 shows a particularly advantageous shape of the pre-formed holding bracket 7 which may consist of resilient metal or also of synthetic resin and which comprises between the enlarged upper and lower portions inwardly directed hooks 9 with narrowed openings 8 so that grooves are formed which open outwardly through slot 8 which is of lesser cross sectional dimension than the inner portion of the respective groove.

As shown in FIG. 6, holding or resilient wires 10 can be wedged into these grooves and by means of these holding wires, orthodontic or orthopedic corrections can be carried out without risking that the fixed parts of such devices become loose or separate. FIG. 4 shows only one wire 10 wedged into a groove but it is of course also possible to use two wires so that in each of the two grooves a wire will be located.

FIG. 7 shows a holding device for such brackets as are shown in FIGS. 5 and 6, which holding device also serves as a mold for the plug of synthetic material which forms the bottom portion of the attachment. The holding device of FIG. 7 is formed with a recess 12 which will serve to receive the upper portion of the holding bracket and which is formed with inwardly directed portions 13 adapted to engage the groove forming portions of bracket 7. The legs 14 are arched and form part of the mold wall for molding the plug or tooth contacting portion 16 of plastic synthetic material. Plug 16 consists of self-polymerizing synthetic resin and is formed by filling the molding device 11 after insertion of a bracket 7 with unhardened synthetic resin and then pressing the synthetic resin 16 in the holding device against the surface of the tooth 18. Thereby, as for instance shown in FIG. 9, frequently fins 17 are formed which can be removed after the entire attachment has been completed. FIG. 10 shows the attachment consisting of bracket 7 and synthetic plastic material forming the plug 17, still held by molding device 11.

In order to simultaneously permanently fixing the attachment by means of the permanent adhesive 18 to the tooth and also temporarily or provisionally adhering the attachment to the tooth by means of an annular self-adhesive foil, an auxiliary device is utilized, as shown in detail in FIG. 11. Bracket 7 of the attachment is received and held by plunger 20. An annular plunger 21 is slidably guided on plunger 20. Annular plunger 21 includes a concave annular surface portion 22 of resilient material onto which is placed the provisional pressure sensitive adhesive foil 23 which on its lower free face carries a layer of quick acting adhesive 24.

The operation of this auxiliary device is as follows:

The permanent adhesive 18 is applied to the free face of the synthetic plastic portion 16 of the attachment 7–16. By means of plunger 20, the attachment is then pressed against tooth 1. While being pressed against tooth 1, the annular plunger 21 with the provisional adhesive foil 23–24 is moved towards the tooth so that the annular adhesive foil will cover and adhere to the free outer face portion of plastic plug 16 and to adjacent portions of the surface of tooth 1. While continuing to exert pressure by means of annular plunger 21, plunger 20 is withdrawn and then also plunger 21 is removed from the foil 23–24 which now adheres the attachment 7–16 to tooth 1 as shown in FIG. 12. After adhesive layer 18 has permanently hardened, adhesive foil 23–24 is torn off and the attachment 7–16 is now firmly adhered by means of adhesive layer 18 to tooth 1.

FIG. 13 shows the thus permanently adhered attachment with a holding wire 10 wedged into one of the grooves of the bracket portions 7 of the attachment.

It will be understood that each of the elements described above, or two or more together, may also find a useful application in other types of dental attachments differing from the types described above.

While the invention has been illustrated and described as embodied in an attachment adapted to be adhered to a tooth and in an auxiliary device for adhering such attachment to the tooth, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method for adhering a holding bracket to a tooth, comprising the steps of fixing onto one end of a substantially rigid holding bracket a plug of plastic material having an end face adapted to be directed, when the bracket is attached to a tooth, towards the tooth; conforming said end face to the configuration of a tooth surface to which said bracket is to be attached; and cementing said end face of said plug to said surface of said tooth.

2. A method for adhering a holding bracket to a tooth, comprising the steps of placing a prefabricated substantially rigid holding bracket into a mold defining a cavity having an open end with an end of said bracket, adapted to be directed when the bracket is attached to a tooth towards the tooth, located in said cavity facing and spaced from said open end thereof; filling the remainder of said cavity with plastic material which quickly hardens at ambient temperature; pressing the open end of said cavity against a surface having a configuration equal to that of the tooth surface portion to which said bracket is to be attached so that a plug of plastic material will form at and adhere to at least said end of said bracket and having an outer surface conforming to the surface portion of the tooth to which said bracket is to be attached thereby forming a composite attachment; removing said mold from said composite attachment after said plastic material has been hardened; and cementing said outer surface of said plug at ambient temperature by means of a quickly hardening binder material onto said tooth surface portion.

3. A method for adhering a holding bracket to a tooth, comprising the steps of placing a prefabricated substantially rigid holding bracket into a mold defining a cavity having an open end with an end of said bracket, adapted to be directed when the bracket is attached to a tooth towards the tooth, located in said cavity facing and spaced from said open end thereof; filling the remainder of said cavity with plastic material which quickly hardens at ambient temperature without application of pressure; pressing the open end of said cavity against a surface having a configuration equal to that of the tooth surface portion to which said bracket is to be attached so that a plug of plastic material will form at and adhere to at least said end of said bracket and having an outer surface conforming to the surface portion of the tooth to which said bracket is to be attached thereby forming a composite attachment; allowing said plug of plastic material to harden and thereby to firmly adhere to said bracket; cementing said outer surface of said plug at ambient temperature by means of a quickly hardening binder material onto said tooth surface portion; and removing said mold from said plug of plastic material and said bracket after said outer surface of said plug adheres firmly to said tooth surface.

4. A method for adhering a holding bracket to a tooth, comprising the steps of placing a prefabricated substantially rigid holding bracket into a mold defining a cavity having an open end with an end of said bracket, adapted to be directed when the bracket is attached to a tooth towards the tooth, located in said cavity facing and spaced from said open end thereof; filling the remainder of said cavity with plastic material which quickly hardens at ambient temperature; pressing the open end of said cavity against a surface having a configuration equal to that of the tooth surface portion to which said bracket is to be attached so that a plug of plastic material will form at and adhere to at least said end of said bracket and having an outer surface conforming to the surface portion of the tooth to which said bracket is to be attached; thereby forming a composite attachment; removing said mold from said composite attachment after said plastic material has hardened; attaching said composite attachment to a holder with the outer surface of said plug extending outwardly therefrom; and cementing said outer surface of said plug at ambient temperature by means of a quickly hardening binder material onto said tooth surface portion while pressing by means of said holder said bracket and plug against the same.

5. A method for adhering a holding bracket to a tooth, comprising the steps of placing a prefabricated substantially rigid holding bracket into a mold defining a cavity having an open end with an end of said bracket, adapted to be directed when the bracket is attached to a tooth towards the tooth, located in said cavity facing and spaced from said open end thereof; filling the remainder of said cavity with plastic material which quickly hardens at ambient temperature; pressing the open end of said cavity against a surface having a configuration equal to that of the tooth surface portion to which said bracket is to be attached so that a plug of plastic material will form at and adhere to at least said end of said bracket and having an outer surface conforming to the surface portion of the tooth to which said bracket is to be attached thereby forming a composite attachment; removing said mold from said composite attachment after said plastic material has hardened; removing any fins formed on said plug of plastic material; attaching said composite attachment to a holder with the outer surface of said plug extending outwardly therefrom; and cementing said outer surface of said plug at ambient temperature by means of a quickly hardening binder material onto said tooth surface portion while pressing by means of said holder said bracket and plug against the same.

6. A method for adhering a holding bracket to a tooth, comprising the steps of placing a prefabricated substantially rigid holding bracket into a mold defining a cavity having an open end with an end of said bracket, adapted to be directed when the bracket is attached to a tooth towards the tooth, located in said cavity facing and spaced from said open end thereof; filling the remainder of said cavity with plastic material which quickly hardens at ambient temperature; pressing the open end of said cavity against a surface having a configuration equal to that of the tooth surface portion to which said bracket is to be attached so that a plug of plastic material will form at and adhere to at least said end of said bracket and having an outer surface conforming to the surface portion of the tooth to which said bracket is to be attached thereby forming a composite attachment; removing said mold from said composite attachment after said plastic material has hardened; applying a quick hardening binder material to said outer surface of said plug; placing said outer surface of said plug with said quick hardening binder material thereon onto said tooth surface portion so as to cement said plug to said tooth surface portion; and temporarily fastening said plastic plug onto portions of said tooth laterally adjacent of said tooth surface portion at least until said plug is firmly cemented onto said tooth surface portion.

7. A method for adhering a holding bracket to a tooth, comprising the steps of placing a prefabricated substantially rigid holding bracket into a mold defining a cavity having an open end with an end of said bracket, adapted to be directed when the bracket is attached to a tooth towards the tooth, located in said cavity facing and spaced from said open end thereof; filling the remainder of said cavity with plastic material which quickly hardens at ambient temperature; pressing the open end of said cavity against a surface having a configuration equal to that of the tooth surface portion to which said bracket is to be attached so that a plug of plastic material will form at and adhere to at least said end of said bracket and having an outer surface conforming to the surface portion of the tooth to which said bracket is to be attached thereby forming a composite attachment; removing said mold from said composite attachment after said plastic material has been hardened; applying a quick hardening binder material to said outer surface of said plug; placing said outer surface of said plug with said quick hardening binder material thereon onto said tooth surface portion so as to cement said plug to said tooth surface portion; and temporarily fastening said plastic plug by means of an adhesive foil onto portions of said tooth laterally adjacent of said tooth surface portion at least until said plug is firmly cemented onto said tooth surface portion.

8. A method for adhering a holding bracket to a tooth, comprising the steps of placing a prefabricated substantially rigid holding bracket into a mold defining a cavity having an open end with an end of said bracket, adapted to be directed when the bracket is attached to a tooth towards the tooth, located in said cavity facing and spaced from said open end thereof; filling the remainder of said cavity with plastic material which quickly hardens at ambient temperature; pressing the open end of said cavity against a surface having a configuration equal to that of the tooth surface portion to which said bracket is to be attached so that a plug of plastic material will form at and adhere to at least said end of said bracket and having an outer surface conforming to the surface portion of the tooth to which said bracket is to be attached thereby forming a composite attachment; removing said mold from said composite attachment after said plastic material has been hardened; applying a quick hardening binder material to said outer surface of said plug; placing said outer surface of said plug with said quick hardening binder material thereon onto said tooth surface portion so as to cement said plug to said tooth surface portion; and simultaneously temporarily fastening said plastic plug by means of an adhesive foil onto portions of said tooth laterally adjacent of said tooth surface portion at least until said plug is firmly cemented onto said tooth surface portion.

9. A method for preparing orthodontic and dental fixtures, comprising the steps of placing a prefabricated substantially rigid holding bracket into a mold defining a cavity having an open end with an end of said bracket, adapted to be directed when the bracket is attached to a tooth towards the tooth, located in said cavity facing and spaced from said open end thereof; filling the remainder of said cavity with plastic material which quickly hardens at ambient temperature; pressing the open end of said cavity against a surface having a configuration equal to that of the tooth surface portion to which said bracket is to be attached so that a plug of plastic material will form at and adhere to at least said end of said bracket and having an outer surface conforming to the surface portion of the tooth to which said bracket is to be attached thereby forming a composite attachment; removing said mold from said composite attachment after said plastic material has hardened; and contacting and adhering to said holding bracket at least one wire attached to said fixture.

10. A method according to claim 9 and including the step of applying a self-hardening liquid synthetic material to the contact point between said wire and said holding bracket so as to temporarily fix said wire to said holding bracket upon hardening of said self-hardening synthetic material.

11. The combination of an attachment and an auxiliary device for adhering said attachment to a surface portion of a tooth said attachment comprising a base portion having an end face corresponding to the surface portion of the tooth to which the attachment is to be adhered, said base portion having a convex surface opposite said end surface, and a bracket portion extending outwardly through the center of said convex surface so that an annular portion of said convex surface remains free; and said auxiliary device comprising an elongated member having a hollow end portion in which the outwardly extending portion of said bracket portion is located and an annular member slidably arranged on and surrounding said elongated member and having a resilient concave end face directed towards the free annular convex surface of the attachment and extending laterally beyond the same, said concave end face of said annular member being adapted to engage said annular convex surface of said attachment.

12. An auxiliary device for provisionally fastening an attachment to a surface portion of a tooth, comprising, in combination, first plunger means having an end face for receiving at said end face an orthodontic fastening device; and a second annular plunger slidably guided on and surrounding said first plunger means and having an annular resilient end portion formed with a concavely curved end face facing in the same direction as said end face of said first plunger means.

13. An auxiliary device for provisionally fastening an attachment to a surface portion of a tooth, comprising, in combination, elongated first plunger means formed in an end face thereof with a central cavity for receiving and holding an orthodontic attachment during fastening of the latter to a tooth; and a second annular plunger slidably guided on and surrounding said first plunger means and having in the direction of said end face of said first plunger means an annular end portion of resilient material terminating in an annular concavely curved end face.

14. An auxiliary device for provisionally fastening an attachment to be cemented on one surface thereof to a tooth for holding the attachment on the tooth surface until said attachment is firmly cemented thereto, said auxiliary device comprising a first plunger means for engaging a center portion of a surface of said attachment opposite to said one surface for pressing said one surface onto said tooth surface; and a second annular plunger slidably guided on and surrounding said first plunger and having an annular end portion of resilient material formed with a concavely curved end face facing and extending beyond said opposite surface of said attachment and adapted to carry an adhesive foil over said end face so that said attachment may provisionally be fastened to the tooth by holding said attachment temporarily with said first plunger against said tooth surface and by pressing said adhesive foil by means of said second plunger onto said opposite surface and said tooth surface extending beyond said opposite surface.

15. An auxiliary device for adhering an attachment to a surface portion of a tooth, said auxiliary device comprising, in combination, elongated holding means having a hollow end portion adapted to receive and to hold a portion of an orthodontic attachment; an annular member slidably arranged on and surrounding said elongated holding means and having a resilient concave end face directed towards the free annular convex surface of the attachment and extending laterally beyond the same, said concave end face of said annular member being adapted to engage an annular convex surface of the attachment; and an adhesive sheet member carried by said concave end face of said annular member and adapted to be adhered to the free annular portion of the convex face of the attachment upon engagement between said concave end face of said annular member and a free annular convex surface of the attachment.

16. An attachment adapted to be adhered to a tooth, comprising, in combination, a hard plastic member having an end surface corresponding to the surface portion of the tooth to which the attachment is to be adhered; and a preformed substantially rigid holding bracket having a bottom portion including an outwardly flaring side face at least partly embedded in said plastic member spaced from said end surface thereof, and having an upper portion projecting from said bottom portion and being formed on opposite sides thereof with grooves defining at the outer surfaces of said bracket a slot of smaller cross section than the maximum dimension of said grooves, respectively, so as to be adapted to retain within said grooves holding wires and the like.

References Cited

UNITED STATES PATENTS

| | | | |
|---|---|---|---|
| 3,043,007 | 7/1962 | Wallshein | 32—14 |
| 3,134,380 | 5/1964 | Armao | 128—215 |
| 3,139,088 | 6/1964 | Galleher | 128—208 |
| 3,250,002 | 5/1966 | Collito | 32—6 |
| 3,250,003 | 5/1966 | Collito | 32—14 |

RICHARD A. GAUDET, *Primary Examiner.*

J. W. HINEY, *Assistant Examiner.*